(12) United States Patent
Mugnier

(10) Patent No.: US 11,230,299 B2
(45) Date of Patent: Jan. 25, 2022

(54) DEVICE FOR SUPPORTING AND GUIDING A VEHICLE HAULING CABLE OF A TRANSPORT INSTALLATION, ARTICULATION OF SUCH A DEVICE AND METHOD OF MANUFACTURING THE DEVICE

(71) Applicant: POMA, Voreppe (FR)

(72) Inventor: Jean-François Mugnier, Courchevel Village (FR)

(73) Assignee: POMA, Voreppe (FR)

( * ) Notice: Subject to any disclaimer, the term of this patent is extended or adjusted under 35 U.S.C. 154(b) by 290 days.

(21) Appl. No.: 16/277,205

(22) Filed: Feb. 15, 2019

(65) Prior Publication Data

US 2019/0263428 A1    Aug. 29, 2019

(30) Foreign Application Priority Data

Feb. 26, 2018    (FR) ........................... 1851651

(51) Int. Cl.
*B61B 12/02* (2006.01)
*F16F 1/38* (2006.01)
*F16C 27/06* (2006.01)

(52) U.S. Cl.
CPC ............ *B61B 12/026* (2013.01); *B61B 12/02* (2013.01); *F16C 27/06* (2013.01); *F16F 1/38* (2013.01); *F16F 2228/08* (2013.01)

(58) Field of Classification Search
CPC ....... B61B 12/02; B61B 12/026; F16C 27/06; F16C 1/38; F16C 2228/08
See application file for complete search history.

(56) References Cited

U.S. PATENT DOCUMENTS

| 4,220,095 | A | * | 9/1980 | Segafredo | ............... B61B 12/06 104/173.2 |
| 4,509,430 | A | * | 4/1985 | Creissels | ................... B61B 7/00 104/112 |
| 4,777,886 | A | * | 10/1988 | Tarassoff | ................ B61B 12/02 104/180 |
| 4,995,319 | A | * | 2/1991 | Mugnier | ................. B61B 12/02 104/112 |
| 2009/0057632 | A1 | * | 3/2009 | Bonifat | ................... B61B 12/02 254/390 |
| 2018/0265099 | A1 | * | 9/2018 | Messaoud | ............. B61B 12/026 |

(Continued)

FOREIGN PATENT DOCUMENTS

| BE | 479697 A | 2/1948 |
| CA | 2637968 A1 | 2/2009 |

(Continued)

*Primary Examiner* — Jason C Smith
(74) *Attorney, Agent, or Firm* — Oliff PLC

(57) ABSTRACT

Articulation for a supporting and guiding device for a vehicle hauling cable of a transport installation, including a first frame adapted to be attached to a support carrying a rotary roller intended to be in contact with the hauling cable, a second frame adapted to be introduced into an orifice formed within a carrying structure of the device, and at least one elastic element placed between the first and second frames and adapted to allow a pivoting movement of the first frame relative to the carrying structure, the articulation having a variable outer diameter able to decrease when the articulation is introduced into the orifice.

12 Claims, 3 Drawing Sheets

(56) References Cited

U.S. PATENT DOCUMENTS

| | | | |
|---|---|---|---|
| 2019/0263428 A1* | 8/2019 | Mugnier | F16F 1/38 |
| 2020/0385027 A1* | 12/2020 | Valayer | B61B 12/02 |
| 2021/0086799 A1* | 3/2021 | Messaoud | B61B 12/02 |

FOREIGN PATENT DOCUMENTS

| | | | |
|---|---|---|---|
| EP | 0230814 | A1 | 8/1987 |
| EP | 0396161 | A1 | 11/1990 |
| EP | 0529629 | A1 | 3/1993 |
| FR | 2744974 | A1 | 8/1997 |
| FR | 2867142 | A1 | 9/2005 |
| FR | 2920385 | A1 | 3/2009 |

* cited by examiner

DEVICE FOR SUPPORTING AND GUIDING A VEHICLE HAULING CABLE OF A TRANSPORT INSTALLATION, ARTICULATION OF SUCH A DEVICE AND METHOD OF MANUFACTURING THE DEVICE

TECHNICAL FIELD OF THE INVENTION

The invention relates to the support and guidance of a vehicle hauling cable of a transport installation, and more particularly the support and guidance of an aerial hauling cable.

STATE OF THE ART

Currently, hauling cable transport installations for vehicles are equipped with supporting and guiding devices such as balancing arms for maintaining and guiding hauling cables moving between passenger embarking and disembarking stations. Generally, the balancing-arms are carried by towers and are equipped with rotary rollers the hauling cable bears on. The rollers are mounted on articulated beams so as to freely rotate in order to maintain the hauling cable bearing on the tower during variations in the deflection of the cable due to the weight of the vehicle and the passage of its clamp on the rollers.

French patent application FR2920385 filed in the name of the Applicant discloses a mechanical device for adjusting a balancing arm for supporting and guiding an aerial cable of a lift installation. The balancing arm comprises cable guiding rollers rotatably mounted on a carrier frame according to parallel axes of rotation spaced out along the carrier frame.

In particular, an axis is used, which is an elongate piece, for articulating a mobile element to rotate or pivot relative to a support on which the axis is fixedly mounted. The mobile element is provided with a through hole into which the axis is introduced. In addition, one or more bearings are placed between the axis and the mobile element to allow the pivoting or rotating movement of the mobile element relative to the support. In general, rolling bearings, such as roller or ball bearings, are used for a rotary articulation; and plain bearings, for example an elastic hollow cylindrical part, are used for a pivot articulation. But the rolling bearings require lubrication and it is difficult to perform such lubrication on balancing arms when they are high or difficult to access. Furthermore, plain bearings can wear if they are in a wrong place within the through-hole, or if environmental conditions are extreme, or according to the use of the transport installation.

To achieve pivot articulations that are more robust and wear less easily, a steel axis and a rubber mounted by adhesion around the axis can be used. The rubber mechanically adheres to the axis so that it cannot be removed from the axis without destroying the rubber or axis. The articulation is then introduced into an orifice formed within a support. But the introduction is difficult because the orifice of the support is previously defined and it is difficult to machine the orifice again in order to facilitate the introduction of the articulation. Moreover, the introduction of the articulation needs a knowhow from the user placing the articulation by successive pushes. Indeed, the introduction of the articulation is carried out in a first direction and for each push, the articulation tends to come out of the orifice in a second direction opposite to the first one, due to the elastic deformation constraints exerted on the rubber for each push.

OBJECT OF THE INVENTION

An object of the invention is to overcome these disadvantages, and more particularly to provide means for articulating a mobile element with respect to a support, which require little maintenance, which are robust and which are easy to place onto the support.

According to one aspect of the invention, there is provided an articulation for a supporting and guiding device for a vehicle hauling cable of a transport installation, comprising a first frame adapted to be attached to a support carrying a rotary roller intended to be in contact with the hauling cable.

The articulation comprises a second frame adapted to be introduced into an orifice formed within a carrying structure of the device, and at least one elastic element placed between the first and second frames and adapted to allow a pivoting movement of the first frame relative to the carrying structure, and the articulation has a variable outer diameter able to decrease when the articulation is introduced into the orifice.

Thus, an articulation is provided which does not require any lubrication. In addition, the articulation can be more easily introduced because its outer diameter can vary. Such an articulation is particularly adapted to be introduced within an orifice without modifying the diameter of the orifice.

The outer diameter of the articulation may be greater than or equal to an inner diameter of the orifice prior to an introduction of the articulation into the orifice.

The second frame can comprise at least two parts separated from each other by a gap.

Said at least one elastic element can enter within the gap separating said at least two parts of the second frame.

The first frame can comprise at least two parts separated from each other by an additional gap.

Said at least one elastic element can further enter within the additional gap separating said at least two parts of the first frame.

Said at least two parts of the second frame can form two ends of a same piece presenting a slot extending along a longitudinal axis of the piece and corresponding to the gap separating said at least two parts of the second frame.

Said at least two parts of the first frame can form two ends of a same internal piece presenting a slot extending along a longitudinal axis of the internal piece and corresponding to the additional gap separating said at least two parts of the first frame.

Said at least one elastic element can comprise a rubber material.

The articulation can comprise an intermediate element located between the first and second frames, and two elastic elements placed on either side of the intermediate element.

According to another aspect, there is provided a device for supporting and guiding a vehicle hauling cable of a transport installation, comprising a carrying structure in which an orifice is formed, at least one support carrying a rotary roller intended to be in contact with the hauling cable, and an articulation, as defined above, introduced into the orifice and connecting the support to the carrying structure.

According to yet another aspect, there is provided a method of manufacturing a device for supporting and guiding a vehicle hauling cable of a transport installation.

The method comprises placing at least one elastic element between a first and a second frame so as to form an articulation having a variable outer diameter, the method comprising introducing the articulation into an orifice formed within a carrying structure of the device by decreasing the outer diameter of the articulation, and fixing the first frame to a support carrying a rotary roller intended to be in contact with the hauling cable, the first frame being able to pivot relative to the carrying structure.

BRIEF DESCRIPTION OF THE DRAWINGS

Other advantages and features will appear more clearly from the following description of particular embodiments of the invention given by way of non-limitative examples and represented in the annexed drawings, in which.

DETAILED DESCRIPTION

Figure 1:
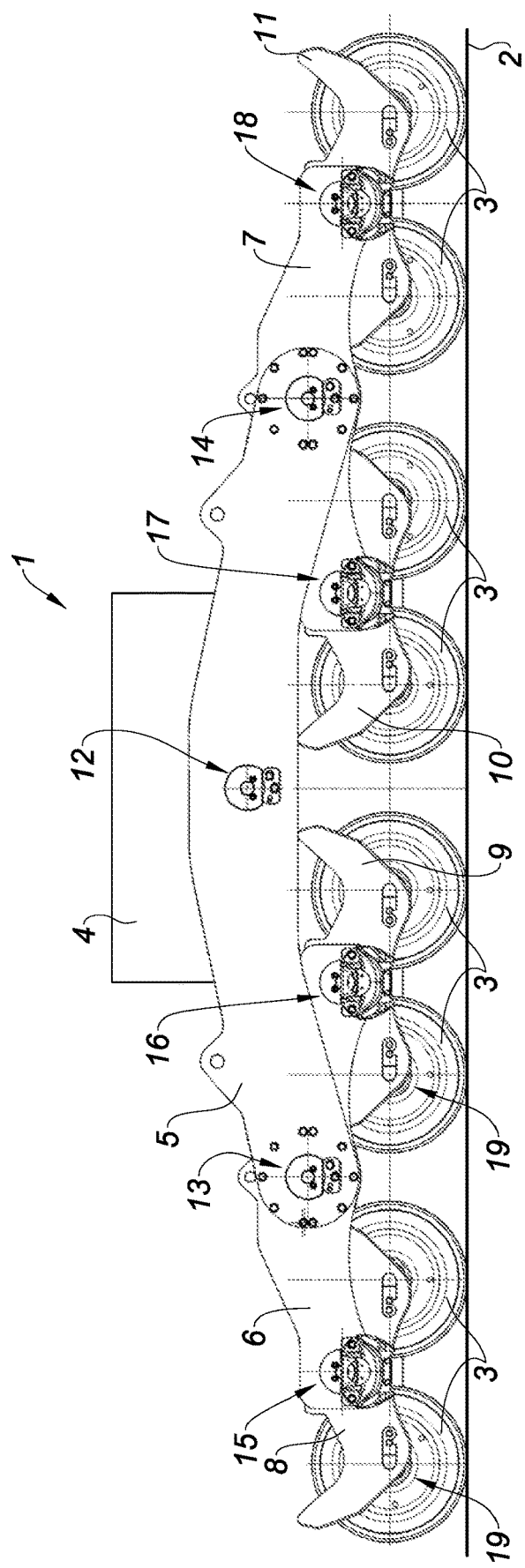
FIG. 1 schematically illustrates a perspective side view of an embodiment of a supporting and guiding device according to the invention.
Figure 5:
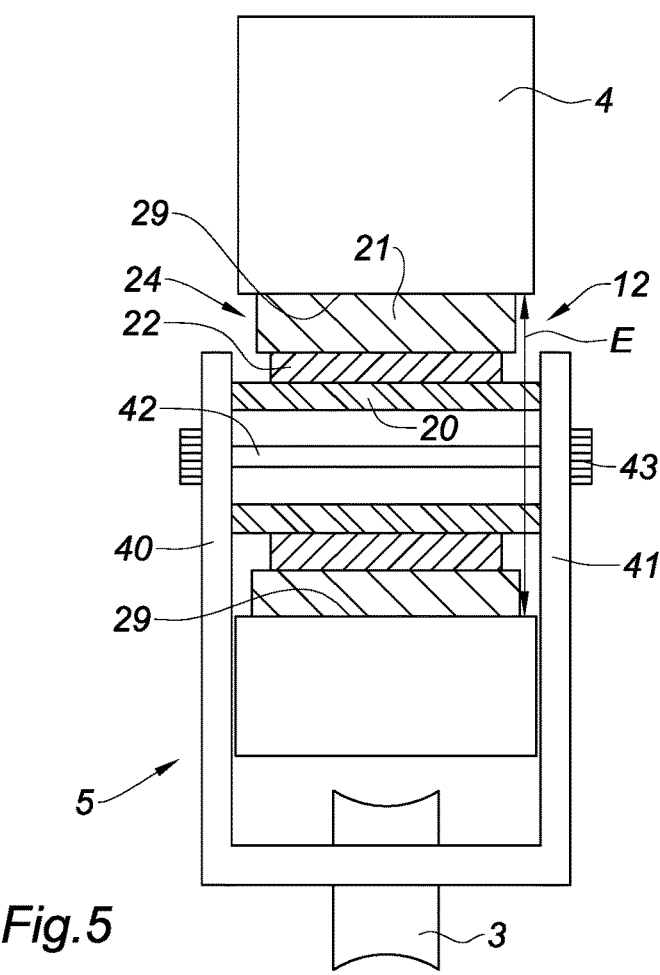
FIG. 5 schematically illustrates a sectional view of another embodiment of a supporting and guiding device.

In FIGS. 1 and 5, there is shown a device 1 for supporting and guiding a vehicle hauling cable 2. The device 1 for supporting and guiding, also noted as a balancing arm, provides support and guidance for the moving hauling cable 2 of a vehicle transport installation. The vehicle transport installation using the hauling cable 2 is preferably of the cableway type, such as a chair lift or gondola lift, and the hauling cable 2 is an aerial one. The installation can be of the funicular type and the hauling cable 2 is located at the ground level. The passenger transport vehicles are hooked to the hauling cable 2 in order to be hauled from one station to another of the installation. In particular, the balancing arm 1 is a mobile structure carrying rotating rollers 3 intended to be in contact with the hauling cable 2. The balancing arms 1 are generally movably mounted at the top of a tower, not shown here for simplification purposes.

A balancing arm 1 comprises a main beam 4, at least one mobile element 5 to 11 pivotally mounted relative to the carrying structure 4, via at least one articulation 12 to 18. The mobile elements 5 to 11 are also called secondary beams. The main beam 4 is fixedly mounted on the tower. A mobile element 5 to 11 makes it possible to articulate the rollers 3 with respect to the main beam 4 in order to follow the movements of the hauling cable 2. For example, in FIG. 1 there is shown a balancing arm 1 provided with eight rotary rollers 3. The balancing arm 1 comprises a main mobile element 5 movably mounted on the main beam 4, via a first articulation 12. Two secondary mobile elements 6, 7 are movably mounted on the main mobile element 5 via second and third articulations 13, 14, respectively. Two tertiary mobile elements 8, 9 are movably mounted on a first secondary mobile element 6, via two articulations, respectively noted fourth and fifth articulations 15, 16. Two other tertiary mobile elements 10, 11 are movably mounted on a second secondary mobile element 7, via two articulations, respectively noted sixth and seventh articulations 17, 18. Each roller 3 is rotatably mounted on a tertiary mobile element 8 to 11 via a rotating articulation 19. The rotational articulations 19 allow free rotation of the rollers 3. The other seven articulations 12 to 18 are preferably pivot articulations.

In general, a first mobile element 5 to 11 is articulated mounted on a second mobile element 5 to 7, or a fixed element 4, via an articulation 12 to 18. The first mobile element 5 to 11 is also noted support carrying a rotary roller 3, and the second mobile element 5 to 7 or fixed element 4, is also called carrying structure. In other words, the main and secondary mobile elements 5 to 7 are both a roller support 3 and a carrying structure. The articulations 12 to 18 thus allow an articulation movement of a support 5 to 11 relative to a carrying structure 4 to 7.

More particularly, the rollers 3 are rotatably mounted and the mobile elements 5 to 11 are pivotally mounted. The term "rotatably mounted" means an element that can perform one or more complete rotations around an axis of rotation. The term "pivotally mounted" means an element that can perform a portion of rotation less than 360°, more particularly less than 20°, in one direction of rotation or in the other. Preferably, the first articulation 12 allows a pivoting movement of 50 maximum in one direction of rotation or in the other. For example, the second and third articulations 13, 14 allow a pivoting movement of 100 maximum in one direction of rotation or in the other. In another example, the other four articulations 15 to 18 allow a pivoting movement of 150 maximum in one direction of rotation or in the other. The pivoting movement allowed by each articulation 12 to 18 depends from its position within the balancing arm 1 and the load exerted by the hauling cable 2.

FIGS. 2 to 5 show embodiments of an articulation 15 to 18. In general, the articulation 15 to 18 comprises a first frame 20, a second frame 21 and at least one elastic element 22, 23 placed between the first and second frames 20, 21. The first frame 20 is adapted to be fixed to a support 5 to 11 carrying a rotary roller 3. The second frame 21 is adapted to be introduced into an orifice 24 formed within a carrying structure 4 to 7 of the balancing arm 1. In addition, the articulation 12 to 18 has a variable outer diameter D1 able to decrease in order to introduce the articulation 12 to 18 into the orifice 24. When the articulation 12 to 18 is placed within the carrying structure 4 to 7, the elastic element 22, 23 allows a pivoting movement of the first frame 20, and therefore of the support 5 to 11, with respect to the carrying structure 4 at 7 in which the articulation 12 to 18 is introduced.

The first and second frames 20, 21 are generally cylindrical. The term "cylinder" means a solid limited by a cylindrical surface generated by a set of parallel straight lines, denoted generatrices, based on a closed planar curve, denoted directrix, and two planes intersecting the generatrices. The first frame 20 can have a hollow or full body. In particular, the second frame 21 comprises a hollow body so as to introduce the first frame 20 within the second frame 21. In other words, the second frame at least partially surrounds the first frame 20. The frames 20, 21 are preferably made of metal, for example steel. The frames 20, 21 are preferably coaxial to a longitudinal axis A extending along the frames 20, 21.

Figure 2:
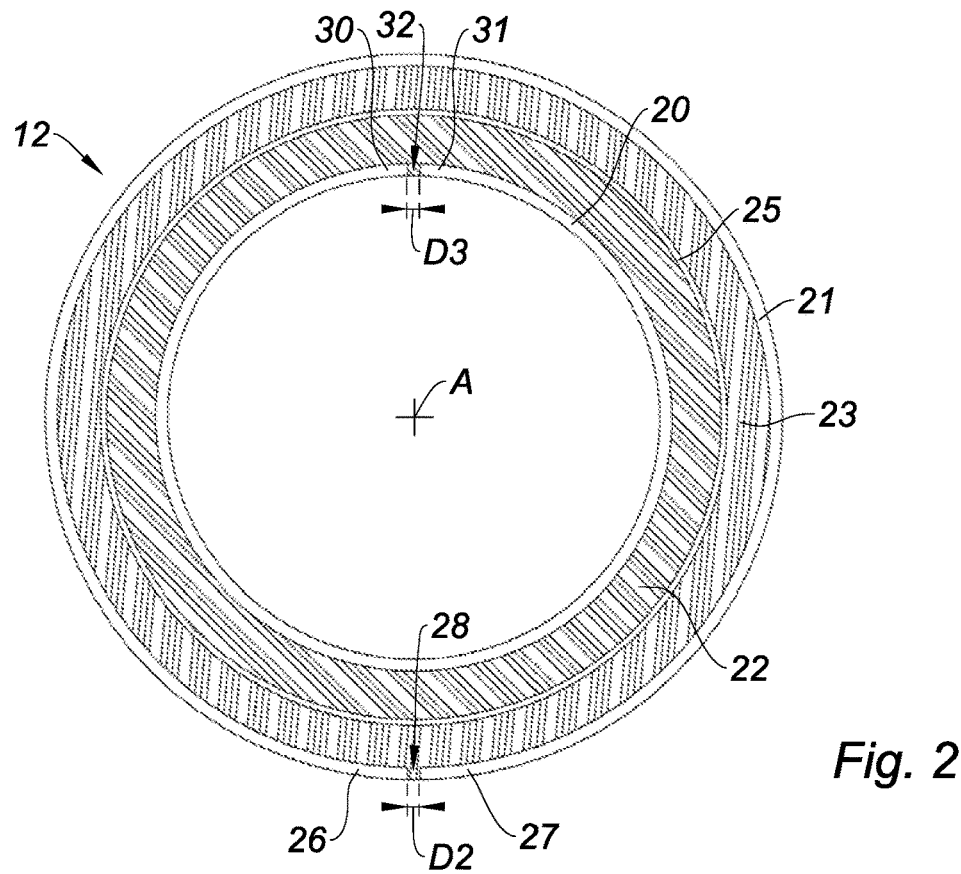
FIG. 2 schematically illustrates a sectional view of an embodiment of an articulation according to the invention.
Figure 3:
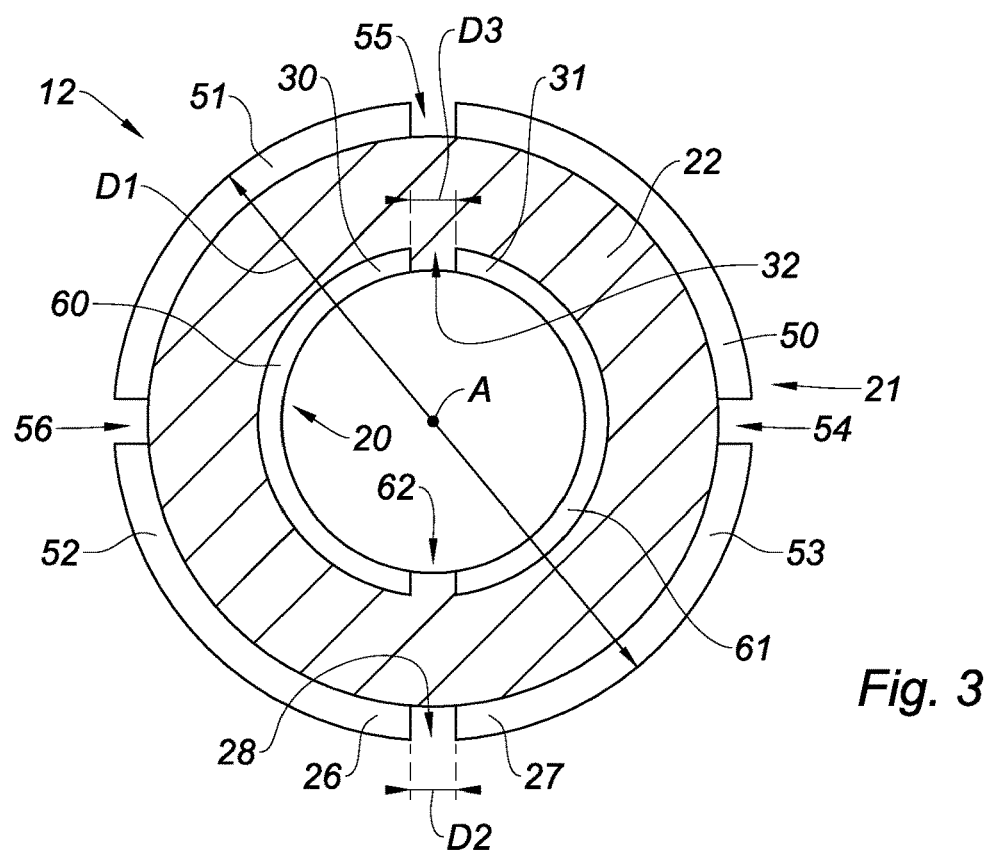
FIG. 3 schematically illustrates a sectional view of another embodiment of the articulation, when the articulation is located outside the carrying structure.
Figure 4:
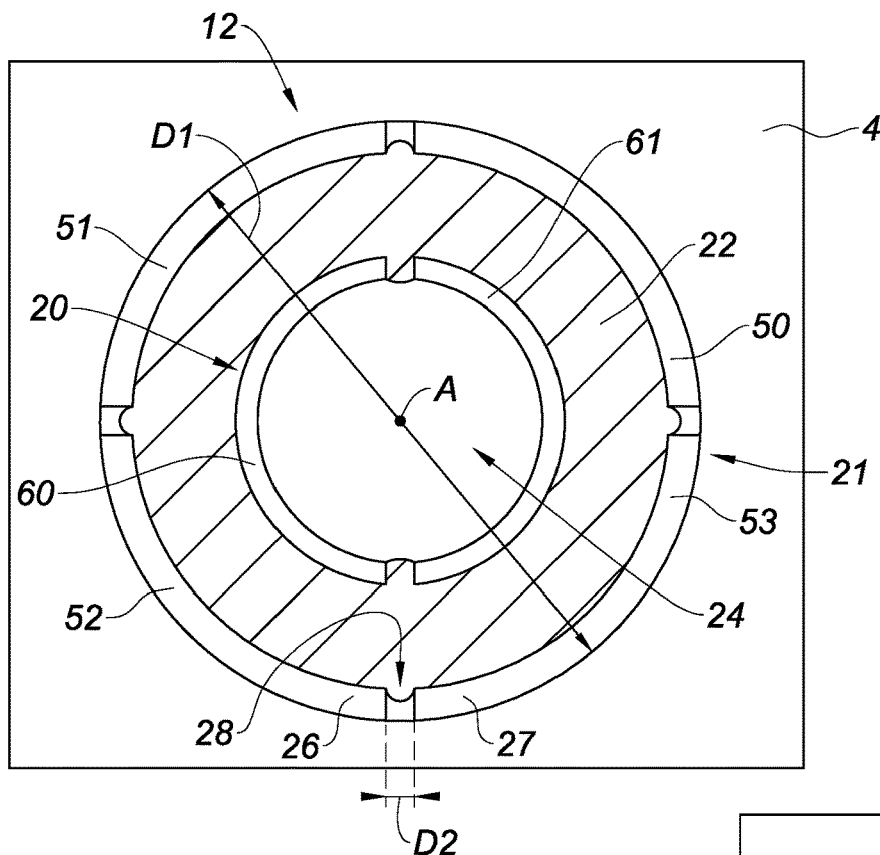
FIG. 4 schematically illustrates a sectional view of the articulation in FIG. 3, when the articulation is introduced inside the carrying structure.

The articulation can comprise one or more elastic elements 22, 23. As illustrated in FIGS. 3 to 5, the articulation comprises an elastic element 22. In FIG. 2, the articulation 12 comprises two elastic elements 22, 23. An elastic element 22, 23 is, for example, made of an elastomeric material, preferably rubber. More particularly, the rubber mechanically adheres to the frames 20, 21 so that it cannot be removed from the articulation 12 to 18 without destroying the rubber or frames 20, 21. The elastic elements 22, 23 are mounted between the first and second frames 20, 21. The elastic elements 22, 23 allow the pivoting movement of the first frame 20 relative to the second frame 21. When the articulation 12 to 18 comprises an elastic element 22, the elastic element 22 adheres to the two frames 20, 21, as illustrated in FIGS. 3 and 4. Thus, the elastic element 22 is firmly attached to the two frames 20, 21, and because of its elastic properties, the elastic element 22 allows a limited angular pivoting movement about the longitudinal axis A of the frames 20, 21.

Alternatively, the articulation 12 to 18 can comprise one or more intermediate elements 25 and several elastic elements 22, 23. The intermediate elements 25 are hollow cylinders located between the first and second frames 20, 21. The elastic elements 22, 23 are located on either side of an intermediate element 25, to which they adhere firmly. At least one first elastic element 22 also adheres to the first frame 20 and a second elastic element 23 also adheres to the second frame 21, as shown in FIG. 2. The intermediate elements 25 facilitate the angular pivoting movement of the first frame 20 relative to the second frame 21.

In order to facilitate the introduction of the articulation 12 to 18 into the orifice 24 of the carrying structure 4 to 7, the outer diameter D1 of the articulation 12 to 18 is variable. That is to say that the outer diameter D1 of the articulation 12 to 18 is able to decrease when the articulation 12 to 18 is introduced into the orifice 24 of the carrying structure 4 to 7. Thus, when the articulation 12 to 18 is introduced into the orifice 24, the second frame 21 bears on the elastic element 22, 23, which is deformed so as to decrease the outer diameter D1 of the articulation 12 to 18. It is therefore possible to introduce the articulation 12 to 18 into the orifice 24, without modifying an inner diameter E of the orifice 24. Then, after introduction of the articulation 12 to 18, the elastic element 22, 23 exerts a restoring force that bears the second frame 21 against an inner surface 29 of the orifice 24 of the carrying structure 4 to 7, thereby firmly securing the articulation 12 to 18 to the carrying structure 4 to 7. The outer diameter D1 of the articulation 12 to 18 corresponds to the outer diameter of the second frame 21. The second frame 21 prevents the articulation 12 to 18 from exiting from the orifice 24 during the introduction of the articulation 12 to 18 by successive pushes. Preferably, the second articulation 21 is made of a material that is not elastic, for example a metal, more particularly steel. Thus the second frame 21 facilitates the introduction of the articulation 12 to 18 into the orifice 24.

Preferably, the outer diameter D1 of the articulation 12 to 18 is greater than or equal to the inner diameter E of the orifice 24 of the carrying structure 4 to 7, when the articulation 12 to 18 is not introduced into the orifice 24. Thus, after introduction of the articulation 12 to 18 into the orifice 24, the restoring forces exerted by the elastic elements 22, 23 onto the second frame 21 favor the attachment of the articulation 12 to 18 to the carrying structure 4 to 7. It is thus possible to guarantee sufficient mechanical strength of the articulation 12 to 18 with the carrying structure 4 to 7, so that the articulation is fixedly mounted on the carrying structure 4 to 7.

For example, the second frame 21 comprises at least two parts 26, 27 separated from each other by a gap 28. The two parts 26, 27 are opposite from each other. Preferably the gap 28 extends along the second frame 21. Thus, when the articulation 12 to 18 is located outside the carrying structure 4 to 7, as illustrated in FIG. 3, the outer diameter D1 has a non-zero initial value, and a non-zero initial distance D2 separates the two parts 26, 27 of the second frame 21. The gap 28 located between the two parts 26, 27 allows the two parts 26, 27 to approach each other. When the articulation 12 to 18 is introduced into the orifice 24, the parts 26, 27 of the second frame 21 approach each other, the distance D2 separating them decreases, and the outer diameter D1 also decreases, as illustrated in FIG. 4. After introduction of the articulation 12 to 18 into the orifice 24, the outer diameter D1 coincides with the inner diameter E of the orifice 24. In other words, the outer diameter D1 of the articulation 12 to 18 has decreased.

Advantageously, the elastic element 22, 23 can enter within the gap 28 separating the two parts 26, 27 of the second frame 21.

To further favor the introduction of the articulation 12 to 18 into the orifice 24, the first frame 20 can comprise at least two parts 30, 31 separated from each other by an additional gap 32. The two parts 30, 31 of the first frame 20 are opposite from one another. Preferably the additional gap 32 extends along the first frame 20. A non-zero initial distance D3 separates the two parts 30, 31 of the first frame 20. The additional gap 32 allows the elastic element 22 which adheres to the first frame 20 to enter therein when the articulation 12 to 18 is introduced into the orifice 24.

Thus, the additional gap 32 favors the compression of the elastic elements 22, 23 and facilitates the decrease of the outer diameter D1 of the articulation 12 to 18.

According to the embodiment illustrated in FIG. 2, there is shown the articulation 12 before its introduction into an orifice 24. For example, the first elastic element 22 is placed so that it enters the additional gap 32. In addition, the second elastic element 23 enters the gap 28 separating the two parts 26, 27 of the second frame 21. The portion of the second elastic element 23 can be compressed during the introduction of the articulation 12 to 18 into the orifice 24, and will allow the two parts 26, 27 of the second frame 21 to approach each other, during the introduction, while exerting a restoring force to move the parts 26, 27 away from each other after the introduction of the articulation 12 to 18. The portion of the first elastic element 22 can also be compressed during the introduction of the articulation 12 to 18 into the orifice 24, and will allow the two parts 30, 31 of the first frame 20 to approach each another, during the introduction, while exerting a restoring force to move the parts 30, 31 away from each other after the introduction of the articulation 12 to 18 and to exert a restoring force onto the second frame 21 in order to hold it against the inner surface 29 of the orifice 24.

According to one embodiment, illustrated in FIG. 2, the two parts 26 and 27 of the second frame 21 form two ends of a same piece denoted external piece. Both ends 26, 27 are separated by the gap 28. In other words, the external piece presents a slot 28 extending along the longitudinal axis A of the external piece. The slot 28 corresponds to the gap 28 separating the two parts 26, 27 of the second frame 21. The slot 28 can be rectilinear. The slot 28 can be parallel to the longitudinal axis A. It can also extend along the longitudinal axis A, in an oblique, zigzaging, or curved manner. Whatever the shape of the gap 28 separating the two parts 26, 27 of the second frame 21, the gap 28 allows the parts 26, 27 to approach each other. In addition, as shown in FIG. 2, the two parts 30 and 31 of the first frame 20 can also form two ends of a same piece denoted internal piece. Both ends 30, 31 are separated by the additional gap 32. In other words, the internal piece also presents a slot 32 extending along the longitudinal axis A of the internal piece. The slot 32 corresponds to the additional gap 32 separating the two parts 30, 31 of the first frame 20. The slot 32 can be rectilinear, parallel to the longitudinal axis A. It can also extend along the longitudinal axis A, in an oblique, zigzaging, or curved manner.

In a variant, the second frame 21 can comprise several distinct external parts 26, 27 and 50, 51, as illustrated in FIGS. 3 and 4. The external parts 26, 27 and 50, 51 are located on the periphery of the articulation 12 to 18. The external parts 26, 27 and 50, 51 are firmly attached to the elastic element 22 by adhesion. The external parts 26, 27 and 50, 51 are located away from one another so that there is a gap 28, 54, 55, 56 separating two adjacent external parts 26, 27 and 50, 51. The number of gaps 28, 54, 55, 56 favors the variation of the outer diameter D1 of the articulation 12 to 18.

According to yet another variant, the first frame 20 can comprise several distinct internal parts 30, 31. FIG. 3 shows an exemplary embodiment in which the second frame 21 comprises four external parts 26, 27 and 50, 51, and the first frame 20 comprises two internal parts 30, 31. The two internal parts 30, 31 are separated from each other by two gaps 32, 62. The internal parts 30, 31 are firmly fixed to the elastic element 22 by adhesion.

FIG. 3 shows the articulation 12 introduced into the orifice 24 of the main beam 4. It can be noted that the outer diameter D1 of the articulation 1 coincides with the inner diameter of the orifice 24. One can also note that a portion of the elastic element 22 has entered within the gaps separating the external parts 26, 27 and 50 to 51, and another portion of the elastic element 22 has entered within the gaps separating the internal parts 30, 31.

FIG. 5 shows an example where the first articulation 12 connects the main mobile element 5 to the main beam 4. The main mobile element 5 has, for example, a U-shaped cross section and comprises two lateral flanges 40 41 forming a free gap for mounting the main mobile element 5 onto the main beam 4. The main beam 4 comprises an orifice 24 having an inner surface 29 and an inner diameter E. For example, to fix the first frame 20 to the main mobile element 5, a screw 42 screwed into a nut 43 is used. The screw 42 extends through the cavity of the first frame 20 and clamps the two flanges 40, 41 against the two respective ends of the first frame 20.

It is also provided a method of manufacturing the above-defined supporting and guiding device 1. The method comprises placing at least one elastic element 22, 23 between a first and a second frame 20, 21 so as to form an articulation 12 to 18 having a variable outer diameter D1, then introducing the articulation 12 to 18 into an orifice 24 formed within a carrying structure 4 to 7 of the device 1, by decreasing the outer diameter D1 of the second frame 21, then fixing the first frame 20 to a support 5 to 11 carrying a rotary roller 3 intended to be in contact with the hauling cable 2 of the installation. The first frame 20 is able to pivot relative to the carrying structure 4 to 7.

Thanks to the invention which has just been described, there is provided a pivoting articulation adapted to be easily introduced into an orifice of a carrying structure of a supporting and guiding device for a vehicle hauling cable.

The invention claimed is:

1. An articulation for a supporting and guiding device for a vehicle hauling cable of a transport installation, comprising:
 a first frame adapted to be attached to a support carrying a rotary roller intended to be in contact with the vehicle hauling cable,
 a second frame adapted to be introduced into an orifice formed within a carrying structure of the supporting and guiding device, the second frame having a variable outer diameter, and
 at least one elastic element placed between the first and second frames and adapted to allow a pivoting movement of the first frame relative to the carrying structure,
 the articulation having a variable outer diameter able to decrease when the articulation is introduced into the orifice.

2. The articulation according to claim 1, wherein the outer diameter of the articulation is greater than or equal to an inner diameter of the orifice prior to an introduction of the articulation into the orifice.

3. The articulation according to claim 1, wherein the second frame comprises at least two parts separated from each other by a gap.

4. The articulation according to claim 3, wherein said at least one elastic element enters within the gap separating said at least two parts of the second frame.

5. The articulation according to claim 3, wherein the first frame comprises at least two parts separated from each other by an additional gap.

6. The articulation according to claim 5, wherein said at least one elastic element enters within the additional gap separating said at least two parts of the first frame.

7. The articulation according to claim 5, wherein said at least two parts of the first frame form two ends of a same internal piece presenting a slot extending along a longitudinal axis of the same internal piece and corresponding to the additional gap separating said at least two parts of the first frame.

8. The articulation according to claim 3, wherein said at least two parts of the second frame form two ends of a same piece presenting a slot extending along a longitudinal axis of the same piece and corresponding to the gap separating said at least two parts of the second frame.

9. The articulation according to claim 1, wherein said at least one elastic element comprises a rubber material.

10. The articulation according to claim 1, comprising an intermediate element located between the first and second frames, and two elastic elements placed on either side of the intermediate element.

11. A device for supporting and guiding a vehicle hauling cable of a transport installation, comprising:
 a carrying structure in which an orifice is formed,
 at least one support carrying a rotary roller intended to be in contact with the vehicle hauling cable, and
 an articulation according to claim 1 introduced into the orifice and connecting said at least one support to the carrying structure.

12. A method of manufacturing a device for supporting and guiding a vehicle hauling cable of a transport installation, comprising:
 placing at least one elastic element between a first and a second frame, the second frame having a variable outer diameter, so as to form an articulation having a variable outer diameter,
 introducing the articulation into an orifice formed within a carrying structure of the device by decreasing the outer diameter of the articulation, and fixing the first frame to a support carrying a rotary roller intended to be in contact with the vehicle hauling cable, the first frame being able to pivot relative to the carrying structure.

* * * * *